US012424168B2

(12) United States Patent
Ueno et al.

(10) Patent No.: US 12,424,168 B2
(45) Date of Patent: Sep. 23, 2025

(54) DISPLAY DEVICE

(71) Applicant: Sharp Display Technology Corporation, Kameyama (JP)

(72) Inventors: Masafumi Ueno, Kameyama (JP); Hiroyuki Furukawa, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/695,206

(22) PCT Filed: Nov. 30, 2021

(86) PCT No.: PCT/JP2021/043857
§ 371 (c)(1),
(2) Date: Mar. 25, 2024

(87) PCT Pub. No.: WO2023/100244
PCT Pub. Date: Jun. 8, 2023

(65) Prior Publication Data

US 2024/0395206 A1 Nov. 28, 2024

(51) Int. Cl.
*G09G 3/3233* (2016.01)

(52) U.S. Cl.
CPC ..... *G09G 3/3233* (2013.01); *G09G 2300/023* (2013.01); *G09G 2320/0233* (2013.01); *G09G 2320/0271* (2013.01); *G09G 2320/0626* (2013.01); *G09G 2330/023* (2013.01)

(58) Field of Classification Search
CPC ........... G09G 3/3233; G09G 2300/023; G09G 2320/0271; G09G 2320/0626; G09G 2320/0233; G09G 2330/023
USPC .......................................................... 345/204
See application file for complete search history.

(56) References Cited

U.S. PATENT DOCUMENTS

| | | | | |
|---|---|---|---|---|
| 2008/0111771 | A1* | 5/2008 | Miller | G09G 3/30 345/76 |
| 2015/0109356 | A1 | 4/2015 | Yata et al. | |
| 2021/0056908 | A1* | 2/2021 | Park | G09G 3/3275 |
| 2021/0083018 | A1* | 3/2021 | Hu | H10F 77/413 |
| 2021/0125561 | A1* | 4/2021 | Choi | H10K 59/1216 |
| 2021/0159294 | A1* | 5/2021 | Choi | H10K 59/123 |
| 2021/0210707 | A1 | 7/2021 | Levermore | |
| 2022/0231106 | A1 | 7/2022 | Choi et al. | |
| 2022/0335899 | A1* | 10/2022 | Park | G09G 3/3291 |
| 2022/0358885 | A1* | 11/2022 | Lee | G09G 3/3233 |
| 2023/0063949 | A1* | 3/2023 | Ueno | G09F 9/30 |
| 2023/0131968 | A1* | 4/2023 | Kwag | G09G 3/3291 345/204 |

(Continued)

FOREIGN PATENT DOCUMENTS

| | | |
|---|---|---|
| JP | 2015-108816 A | 6/2015 |
| JP | 2021-086151 A | 6/2021 |

*Primary Examiner* — Tom V Sheng
(74) *Attorney, Agent, or Firm* — ScienBiziP, P.C.

(57) ABSTRACT

A display device includes a display portion including a first element layer including an organic light-emitting layer, and a second element layer including a quantum dot light-emitting layer that emits light of the same color as the organic light-emitting layer and overlapping the first element layer in a plan view viewed in a normal direction of the organic light-emitting layer, and a control unit that generates first data corresponding to the first element layer and second data corresponding to the second element layer based on input data.

20 Claims, 25 Drawing Sheets

(56) References Cited

U.S. PATENT DOCUMENTS

2024/0257714 A1 * 8/2024 Yun ...................... G09G 3/3233

* cited by examiner

DISPLAY DEVICE

TECHNICAL FIELD

The disclosure relates to a display device.

BACKGROUND ART

PTL 1 discloses that a light-emitting layer of a display panel includes an organic light-emitting material, a quantum dot, perovskite, or a combination thereof.

CITATION LIST

Patent Literature

PTL 1: JP 2021-86151 A

SUMMARY

Technical Problem

When a quantum dot is used in a display portion of a display device, there is a problem that power consumption is increased while color purity is increased.

Solution to Problem

A display device according to an aspect of the disclosure includes a display portion including a first element layer including an organic light-emitting layer, and a second element layer including a quantum dot light-emitting layer that emits light of the same color as the organic light-emitting layer and overlapping the first element layer in a plan view viewed in a normal direction of the organic light-emitting layer, and a control unit that generates first data corresponding to the first element layer and second data corresponding to the second element layer based on input data.

Advantageous Effects of Disclosure

According to an aspect of the disclosure, power consumption of a display device can be reduced.

DESCRIPTION OF EMBODIMENTS

Figure 1A:
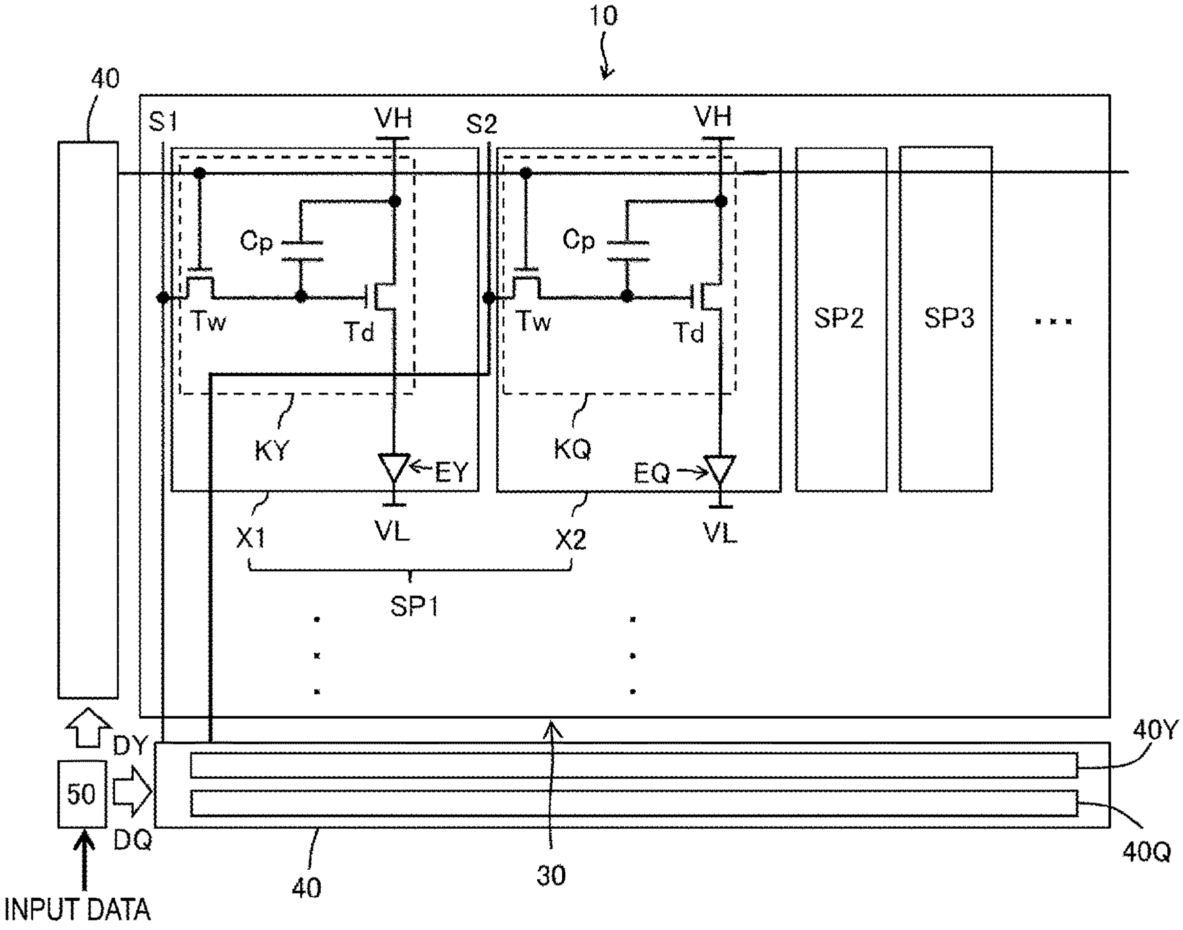
FIG. 1A is a schematic view illustrating a configuration of a display device according to a present embodiment.
Figure 1B:
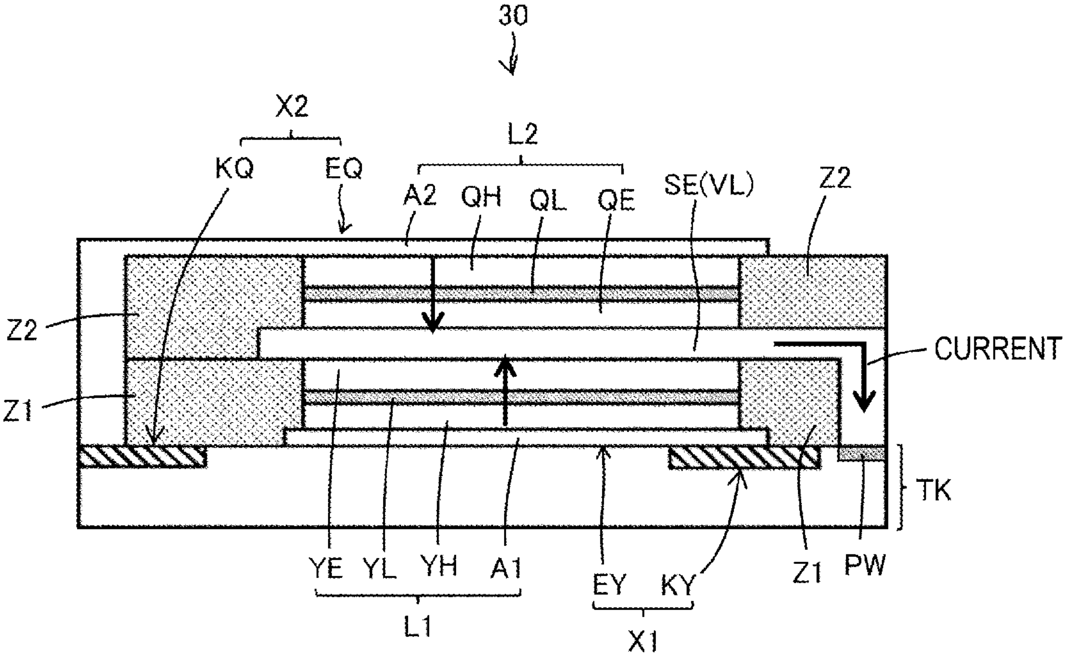
FIG. 1B is a cross-sectional view illustrating a configuration of a display portion.

FIG. 1A is a schematic view illustrating a configuration of a display device according to a present embodiment. FIG. 1B is a cross-sectional view illustrating a configuration of a display portion. As illustrated in FIG. 1A and FIG. 1B, a display device 10 includes a display portion 30, a drive unit 40 (driver circuit) that drives the display portion 30, and a control unit 50 that controls the drive unit 40. The control unit 50 may include a processor and a memory. The display portion 30 includes a pixel circuit substrate (thin film transistor layer) TK, a first element layer L1, a common electrode SE, and a second element layer L2. The pixel circuit substrate TK includes a plurality of pixel circuits KY and KQ. The first element layer L1 includes a first light-emitting element EY, and the second element layer L2 includes a second light-emitting element EQ.

Figure 2:
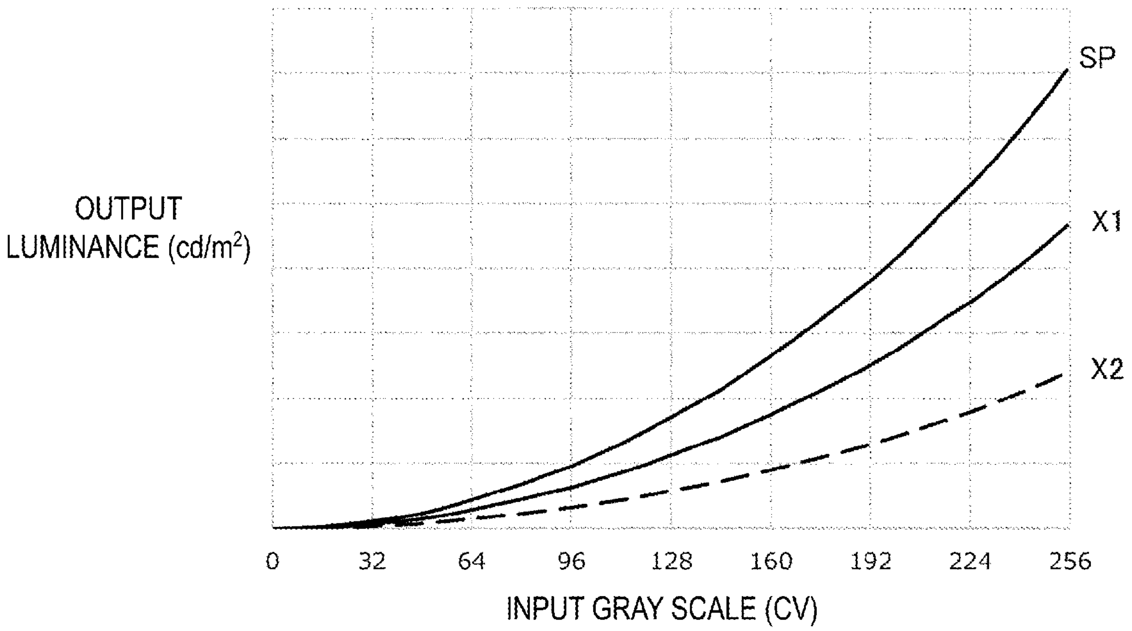
FIG. 2 is a graph showing relationships between an input gray scale and output luminance of a subpixel and a first and a second light-emitting circuits of the subpixel.

As illustrated in FIGS. 1A and 1B and FIG. 2, the display portion 30 is provided with a first light-emitting circuit X1 including the first light-emitting element EY and a first pixel circuit KY and a second light-emitting circuit X2 including the second light-emitting element EQ and a second pixel circuit KQ, and the first light-emitting circuit X1 and the second light-emitting circuit X2 constitute a subpixel SP1. Subpixels SP2 and SP3 similar to the subpixel SP1 are provided in the display portion 30. One of the subpixels SP1 to SP3 may be a red subpixel (R subpixel), one of the remaining two subpixels may be a green subpixel (G subpixel), and the other may be a blue subpixel (B subpixel). A term "subpixel SP" refers to any one of the R subpixel, the G subpixel, and the B subpixel.

The first element layer L1 includes a first electrode A1, a hole transport layer YH, an organic light-emitting layer YL, and an electron transport layer YE in this order from the pixel circuit substrate TK side (lower layer side). The second element layer L2 includes a quantum dot light-emitting layer QL that emits light of the same color as the organic light-emitting layer YL, and overlaps the first element layer L1 in a plan view viewed in the normal direction of the organic light-emitting layer YL. The second element layer L2 includes an electron transport layer QE, a quantum dot light-emitting layer QL, a hole transport layer QH, and a second electrode A2 in this order from the pixel circuit substrate TK side (lower layer side).

The first light-emitting element EY includes the first electrode A1, the hole transport layer YH, the organic light-emitting layer YL, and the electron transport layer YE, and the second light-emitting element QY includes the second electrode A2, the hole transport layer QH, the quantum dot light-emitting layer QL, and the electron transport layer QE. The first and second light-emitting elements EY and EQ share the common electrode SE. The first and second electrodes A1 and A2 may function as anodes, and the common electrode SE may function as a common cathode of the light-emitting elements EY and EQ. Insulating films Z1 overlap the edge of the first electrode A1, and insulating films Z2 overlap the edge of the second electrode A2 and the edge of the common electrode SE. In the case where the subpixel SP1 is of a top emission type, the first electrode A1 may have light reflectivity, and the common electrode SE and the second electrode A2 may be transparent.

In the first light-emitting circuit X1, a gate of a transistor Td (drive transistor) is connected to a data signal line S1 via a transistor Tw, the gate of the transistor Td is connected to a high potential side power supply VH (e.g., ELVDD power supply) via a capacitance element Cp, and the first light-emitting element EY including the organic light-emitting layer YL is connected between a drain of the transistor Td and a low potential side power supply VL (e.g., ELVSS power supply). In the second light-emitting circuit X2, a gate of a transistor Td (drive transistor) is connected to a data signal line S2 via a transistor Tw, the gate of the transistor Td is connected to a high potential side power supply VH (e.g., ELVDD power supply) via a capacitance element Cp, and the second light-emitting element EQ including the quantum dot light-emitting layer QL is connected between a drain of the transistor Td and a low potential side power supply VL (e.g., ELVSS power supply). The pixel circuit substrate TK may be provided with a power supply wiring line PW electrically connected to the low potential side power supply VL (e.g., ELVSS power supply).

The control unit 50 generates, based on input data, data DY (first data) corresponding to the first element layer L1 (corresponding to the first light-emitting circuit X1) and data DQ (second data) corresponding to the second element layer L2 (corresponding to the second light-emitting circuit X2), and outputs data DY and DQ to the drive unit 40. The data DY correspond to the first light-emitting circuit X1, and the data DQ correspond to the second light-emitting circuit X2. The drive unit 40 drives the first light-emitting circuit X1 based on the data DY, and drives the second light-emitting circuit X2 based on the data DQ. In the following description, the first and second data corresponding to the first and second light-emitting circuits X1 and X2 of the subpixel SP whose luminescent color is not specified may be referred to as the data DY and data DQ, respectively. The input data may be referred to as an input gray scale CV.

First Embodiment

The quantum dot light-emitting layer QL has high color purity and wide color reproducibility due to a narrow half width of a light emission wavelength, but has insufficient luminous efficiency, and requires a great current for high luminance output, resulting in an increase in power consumption. The organic light-emitting layer YL has high luminous efficiency and is suitable for high luminance output, but has a narrower color reproduction range than that of the quantum dot light-emitting layer and luminance decrease may occur due to temporal deterioration. Thus, a configuration in which the organic light-emitting layer YL and the quantum dot light-emitting layer QL are layered is adopted, and output control is performed by utilizing the characteristics of each light-emitting layer.

FIG. 2 is a graph showing relationships between an input gray scale and output luminance of a subpixel and a first and a second light-emitting circuits of the subpixel. As shown in FIG. 2, the control unit 50 may generate the first and second data DY and DQ such that output luminance of the first light-emitting circuit X1≥output luminance of the second light-emitting circuit X2 is satisfied for each input gray scale CV, and the sum of the output luminance of the first light-emitting circuit X1 and the output luminance of the second light-emitting circuit X2 may be used as the output luminance of the subpixel SP. In FIG. 2, the first light-emitting circuit X1 and the second light-emitting circuit X2 are turned on at gray scales other than a black gray scale. Input gray scale-output luminance characteristics of the subpixel SP desirably satisfy gamma 2.2.

Figure 3:
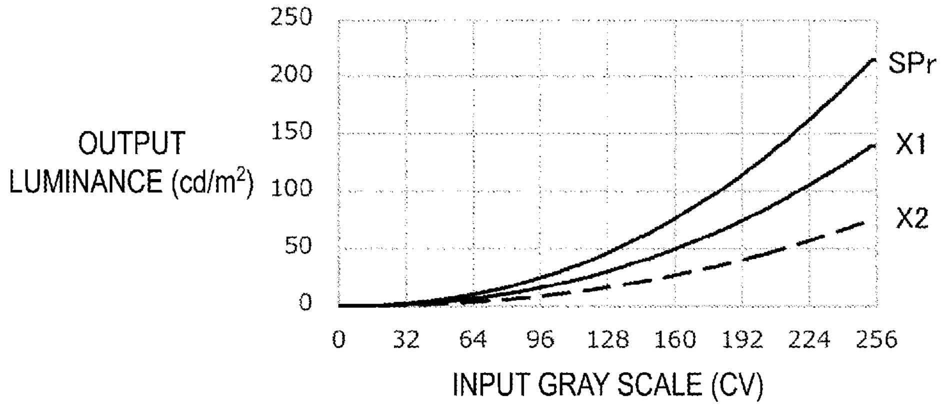
FIG. 3 is a graph showing relationships between an input gray scale and output luminance of a red subpixel and a first and a second light-emitting circuits of the red subpixel.
Figure 4:
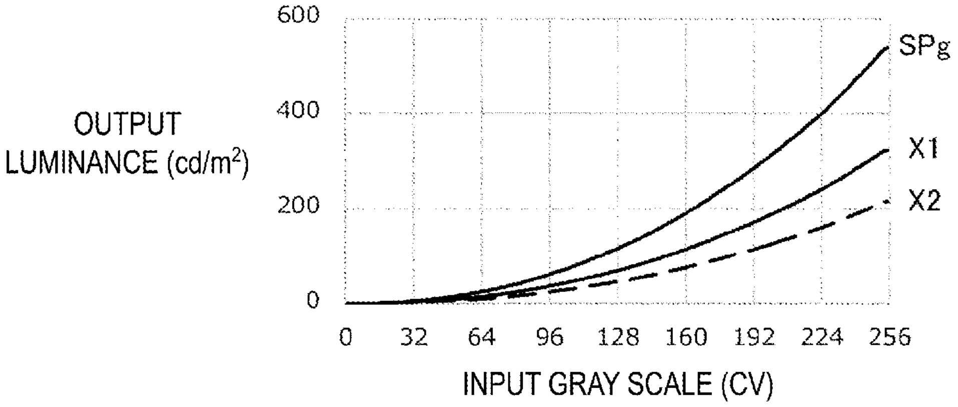
FIG. 4 is a graph showing relationships between an input gray scale and output luminance of a green subpixel and a first and a second light-emitting circuits of the green subpixel.
Figure 5:
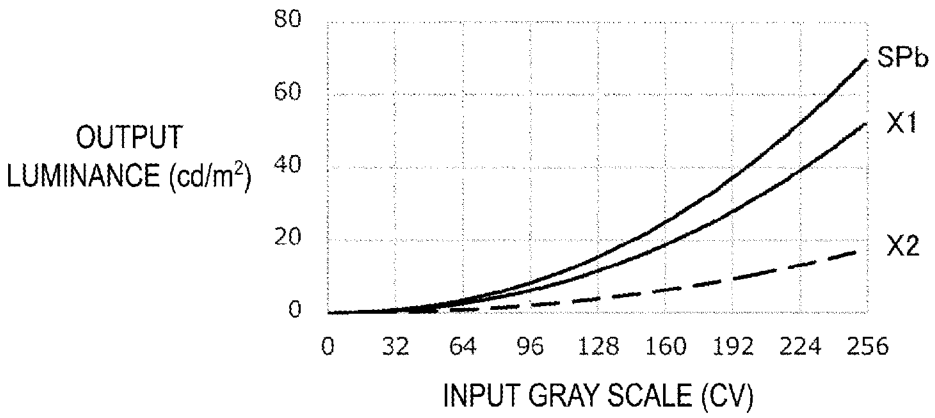
FIG. 5 is a graph showing relationships between an input gray scale and output luminance of a blue subpixel and a first and a second light-emitting circuits of the blue subpixel.

FIG. 3 is a graph showing relationships between an input gray scale and output luminance of a red subpixel and a first and a second light-emitting circuits of the red subpixel. FIG. 4 is a graph showing relationships between an input gray scale and output luminance of a green subpixel and a first and a second light-emitting circuits of the green subpixel. FIG. 5 is a graph showing relationships between an input gray scale and output luminance of a blue subpixel and a first and a second light-emitting circuits of the blue subpixel. As specific examples of FIG. 2, as shown in FIGS. 3 to 5, the output luminance of the first light-emitting circuit X1 and the second light-emitting circuit X2 with respect to the input gray scale CV may be individually set for each of a red subpixel SPr, a green subpixel SPr, and a blue subpixel SPr.

By turning on the second light-emitting circuit X2, the color gamut is widened, the output luminance of the first light-emitting circuit X1 is lowered, and the aged deterioration of the organic light-emitting layer YL can be suppressed. Since the first light-emitting circuit X1 is prioritized in a high gray scale region, power consumption can be reduced.

Figure 6:
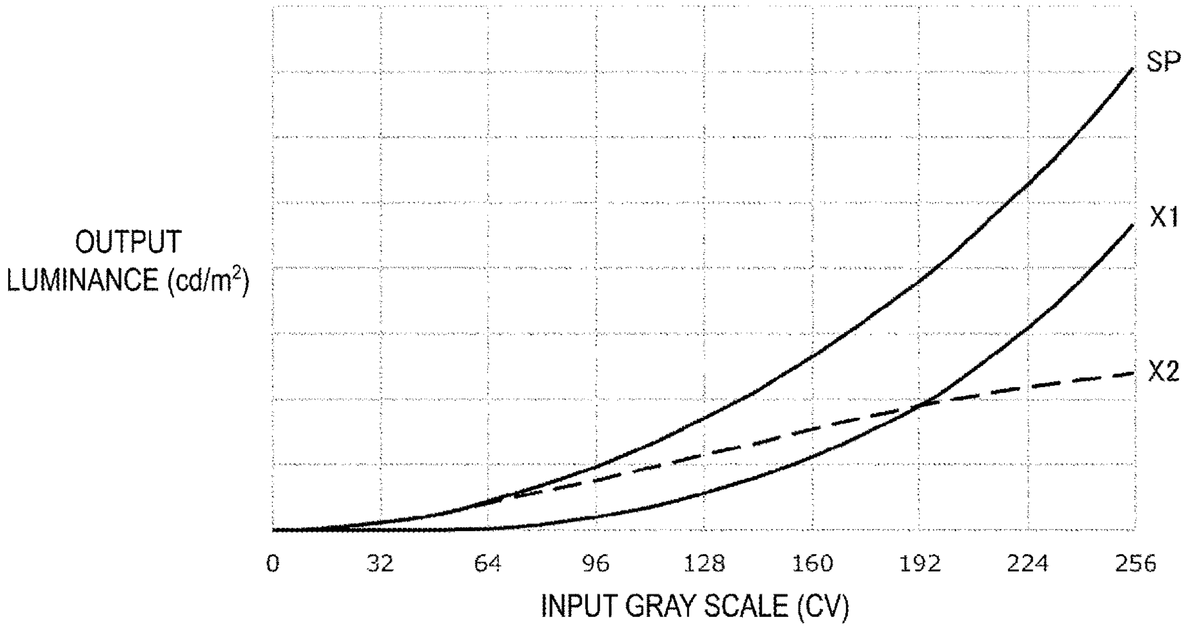
FIG. 6 is a graph showing relationships between an input gray scale and output luminance of a subpixel and a first and a second light-emitting circuits of the subpixel.

FIG. 6 is a graph showing relationships between an input gray scale and output luminance of a subpixel and a first and a second light-emitting circuits of the subpixel. In FIG. 6, control is performed such that the output luminance of the quantum dot light-emitting layer QL is preferentially used for a low gray scale range from the black gray scale to around a central gray scale, and the output luminance of the organic light-emitting layer YL is preferentially used for the input data in a high gray scale range from around the central gray scale to a white gray scale.

Specifically, the control unit 50 may generate the first and second data DY and DQ such that the output luminance of the second light-emitting circuit X2≥the output luminance of the first light-emitting circuit X1 is satisfied for each input gray scale CV in the low gray scale range (black gray scale to near the central gray scale) and the output luminance of the first light-emitting circuit X1>the output luminance of the second light-emitting circuit X2 is satisfied for each input gray scale in the high gray scale range (near the central gray scale to white gray scale). The sum of the output luminance of the first light-emitting circuit X1 and the output luminance of the second light-emitting circuit X2 may be used as the output luminance of the subpixel SP.

For example, only the second light-emitting circuit X2 may be turned on without turning on the first light-emitting circuit X1 in a dark gray scale range (black gray scale to around 70 gray scales), the first light-emitting circuit X1 and the second light-emitting circuit X2 may be turned on in a gray scale range higher than the dark gray scale range, and each of the first light-emitting circuit X1 and the second light-emitting circuit X2 may be turned on at a maximum output (turned on at maximum output luminance) in a maximum gray scale (white gray scale: 255 gray scales). An output curve of the first light-emitting circuit X1 is concave downward, and an output curve of the second light-emitting circuit X2 is convex upward. The input gray scale-output luminance characteristics of the subpixel SP desirably satisfy gamma 2.2.

Figure 7:
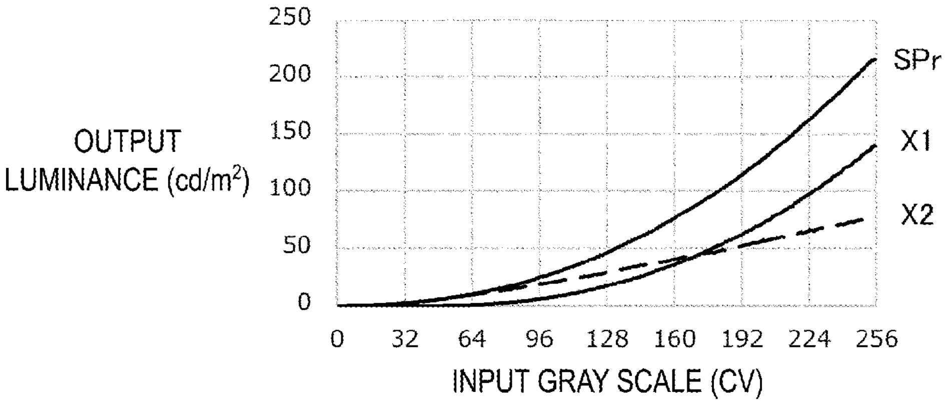
FIG. 7 is a graph showing relationships between an input gray scale and output luminance of a red subpixel and a first and a second light-emitting circuits of the red subpixel.
Figure 8:
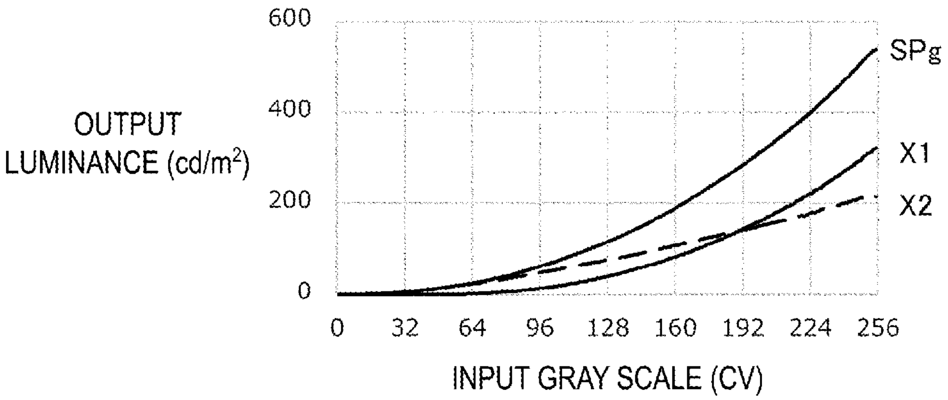
FIG. 8 is a graph showing relationships between an input gray scale and output luminance of a green subpixel and a first and a second light-emitting circuits of the green subpixel.
Figure 9:
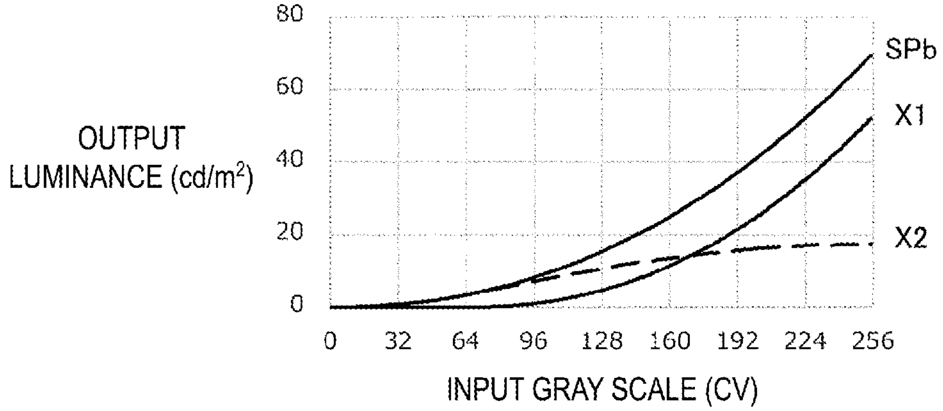
FIG. 9 is a graph showing relationships between an input gray scale and output luminance of a blue subpixel and a first and a second light-emitting circuits of the blue subpixel.

FIG. 7 is a graph showing relationships between an input gray scale and output luminance of a red subpixel and a first and a second light-emitting circuits of the red subpixel. FIG. 8 is a graph showing relationships between an input gray scale and output luminance of a green subpixel and a first and a second light-emitting circuits of the green subpixel. FIG. 9 is a graph showing relationships between an input gray scale and output luminance of a blue subpixel and a first and a second light-emitting circuits of the blue subpixel. As specific examples of FIG. 6, as shown in FIGS. 7 to 9, the output luminance of the first light-emitting circuit X1 and the second light-emitting circuit X2 with respect to the input gray scale CV may be individually set for each of a red subpixel SPr, a green subpixel SPr, and a blue subpixel SPr. Since the light emission of the second light-emitting circuit X2 is weak in the B subpixel, the priority of the low gray scale range may be increased. The subpixel SP in which the difference in color reproducibility between the first light-emitting circuit X1 and the second light-emitting circuit X2 is not great, the priority of the second light-emitting circuit X2 may be lowered.

Since the luminance with respect to the same current is lower in the second light-emitting circuit X2 than in the first light-emitting circuit X1, the resolution is increased by prioritizing the second light-emitting circuit X2 for the low gray scale range, and delicate luminance setting (smooth reproduction of the low gray scale range) can be achieved. Then, a high color gamut can be reproduced by turning on the second light-emitting circuit X2 while reducing power consumption by prioritizing the first light-emitting circuit X1 for the high gray scale range. As a result, the color gamut of gray levels that are frequently included in a natural image can be expanded. In addition, by turning on the second light-emitting circuit X2, the output luminance of the first light-emitting circuit X1 is suppressed, and the temporal deterioration of the organic light-emitting layer YL is reduced.

Figure 10:
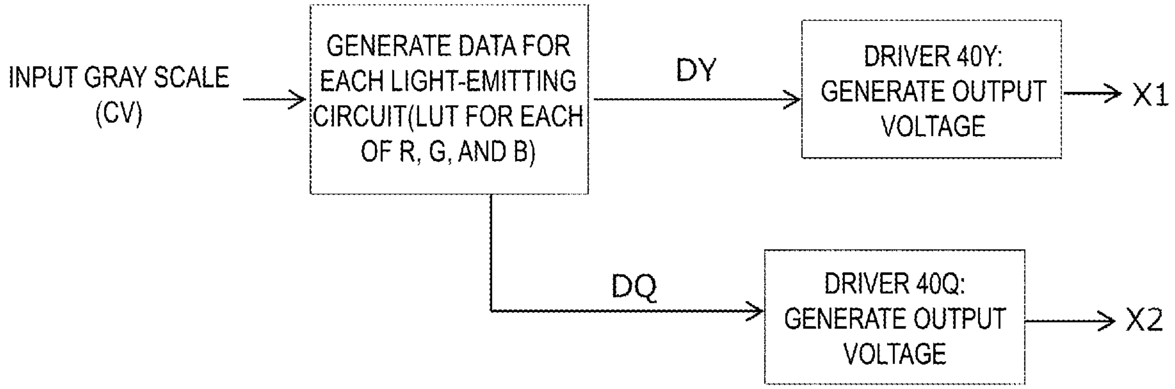
FIG. 10 is a block diagram illustrating a function of control unit and a drive unit.
Figure 11:
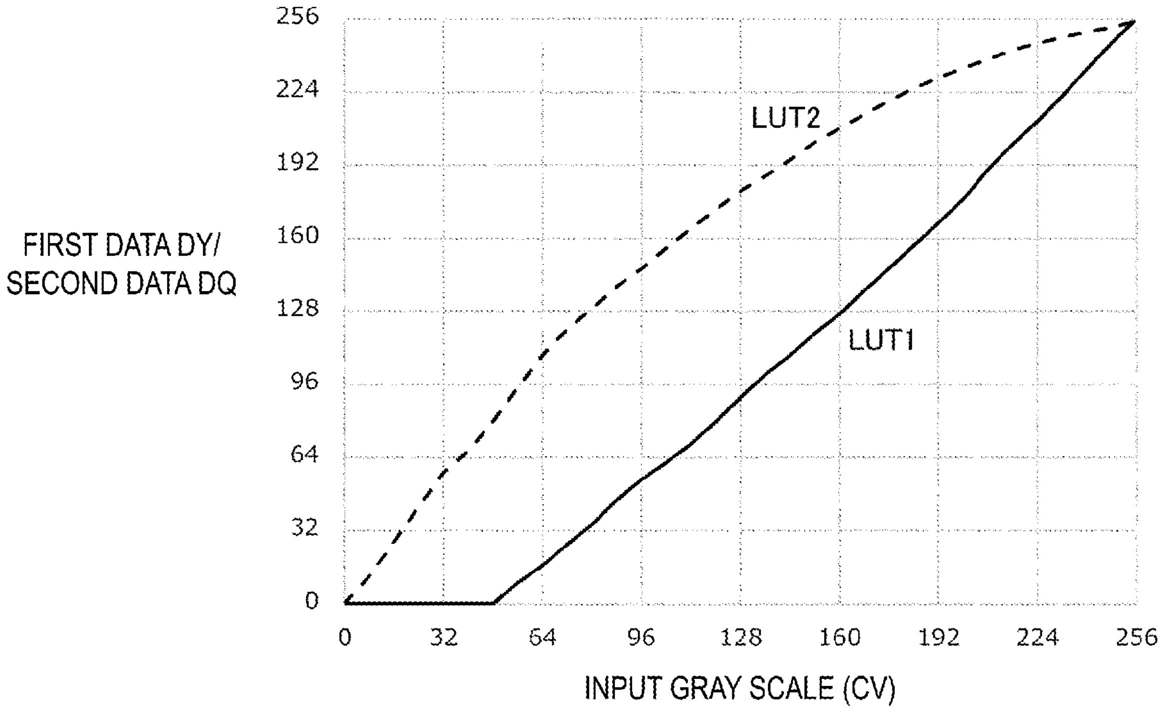
FIG. 11 is an example of LUTs used for generating first and second data (in the case of FIG. 6).
Figure 12:
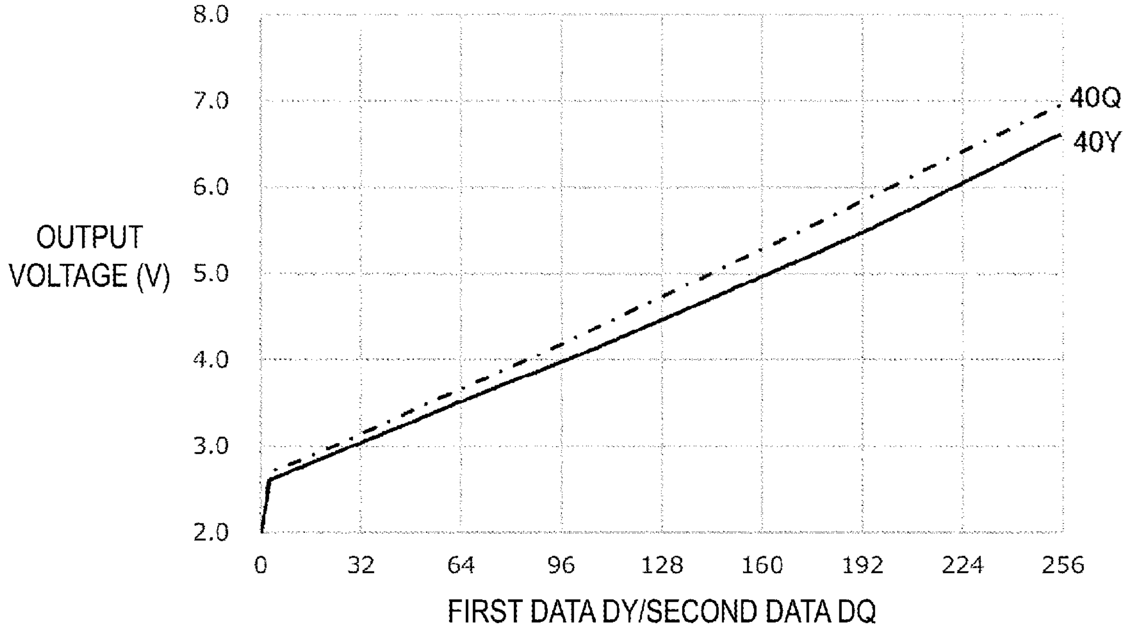
FIG. 12 is a graph showing relationships between the first and second data and output voltages to the first and second light-emitting circuits, respectively.

FIG. 10 is a block diagram illustrating a function of a control unit and a drive unit. FIG. 11 is an example of the LUTs used for generating the first and second data (in the case of FIG. 6). FIG. 12 is a graph showing relationships between the first and second data and output voltages to the first and second light-emitting circuits, respectively. For example, the control unit 50 generates the first data DY corresponding to the first light-emitting circuit X1 based on the input gray scale CV and a look-up table (LUT) 1, and generates the second data DQ corresponding to the second light-emitting circuit X2 based on the input gray scale CV and the LUT2. For example, when the input gray scale is 192 gray scales, the first data DY are 168 gray scales and the second data DQ are 231 gray scales. The LUT1 and LUT2 are preferably prepared for the R subpixel, the G subpixel, and the B subpixel. A driver 40Y (FIG. 1) of the drive unit 40 generates output voltages corresponding to the first data DY and writes the output voltages to a capacitance element Cp of the first light-emitting circuit X1 via the data signal line S1. A driver 40Q (FIG. 1) of the drive unit 40 generates output voltages corresponding to the second data DQ and writes the output voltages to a capacitance element Cp of the second light-emitting circuit X2 via the data signal line S2.

Second Embodiment

Display of wide color gamut need not be necessary depending on an input image. For example, when an achromatic image is input, the display of wide color gamut need not be necessary. In such a case, power saving can be achieved by prioritizing the first light-emitting circuit X1 by weakening the output of the second light-emitting circuit X2. This is because the first light-emitting circuit X1 consumes less current when outputting the same luminance.

Figure 13:
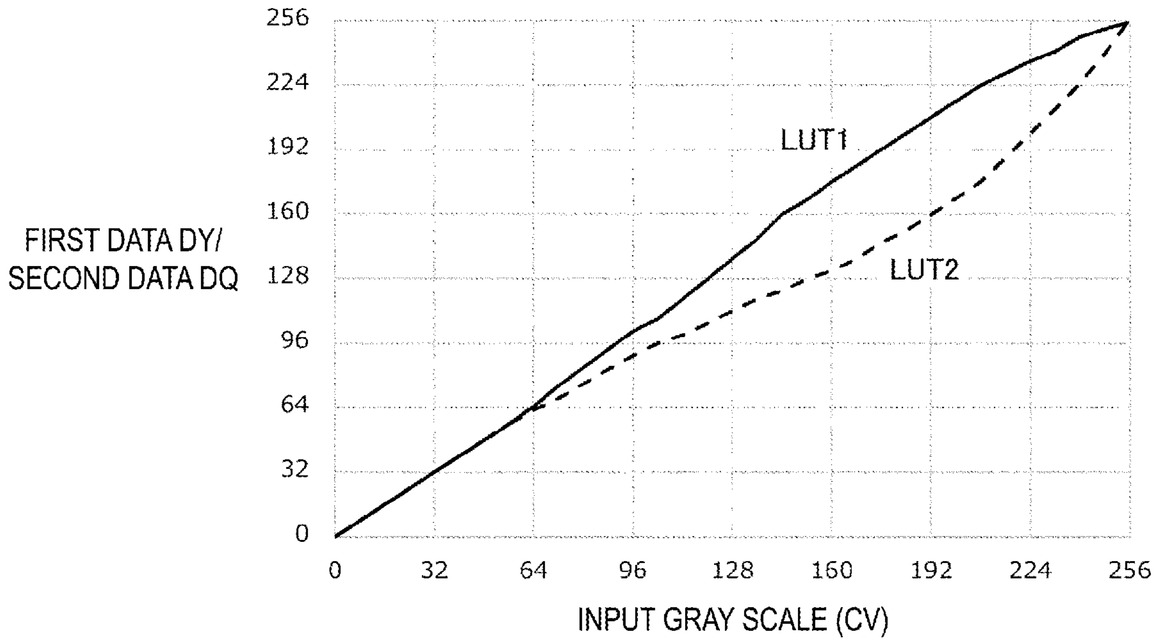
FIG. 13 is an example of LUTs used for generating the first and second data when it is determined that the image is low in chroma.
Figure 14:
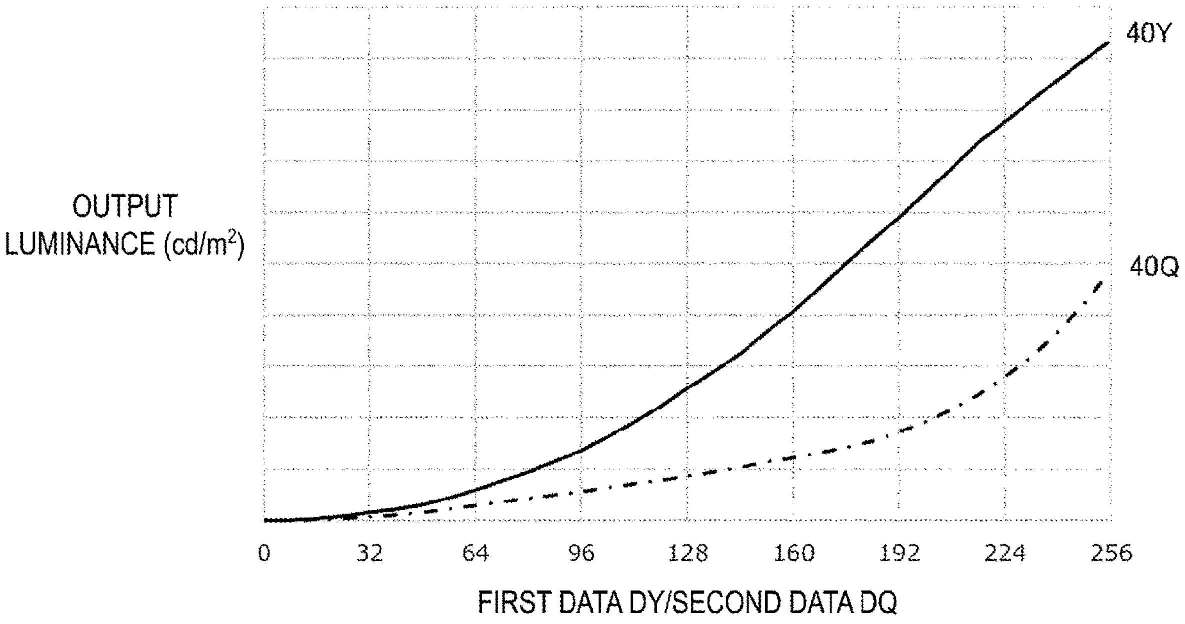
FIG. 14 is a graph showing relationships between the first and second data of FIG. 13 and output voltages to the first and second light-emitting circuits, respectively.

In the second embodiment, the chroma of an input image is analyzed, and when it is determined that the input image is an image with high chroma, wide color gamut display is performed by control as shown in FIGS. 6 to 9, for example, whereas when it is determined that the input image is an image with low chroma, power consumption is reduced by setting the output with prioritizing the first light-emitting circuit X1. FIG. 13 is an example of LUTs used for generating the first and second data when it is determined that the image is low in chroma. Specifically, the first data DY corresponding to the first light-emitting circuit X1 are generated based on the input gray scale CV and the LUT1, and the second data DQ corresponding to the second light-emitting circuit X2 are generated based on the input gray scale CV and the LUT2. FIG. 14 is a graph showing relationships between the first and second data of FIG. 13 and output voltages to the first and second light-emitting circuits, respectively. As shown in FIG. 14, also in the dark gray scale range where the chroma is low, the reproducibility decreases when only the first light-emitting circuit X1 is used, so that the first light-emitting circuit X1 and the second light-emitting circuit X1 may be turned on and the first light-emitting circuit X2 may be greatly prioritized in the central gray scale range and the high gray scale range where the chroma is low. Needless to say, the embodiment is not limited thereto, and display may be performed by only the first light-emitting circuit X1 up to the vicinity of the white gray scale, and the first light-emitting circuit X1 and the second light-emitting circuit X2 may be turned on in the vicinity of the white gray scale.

Figure 15:
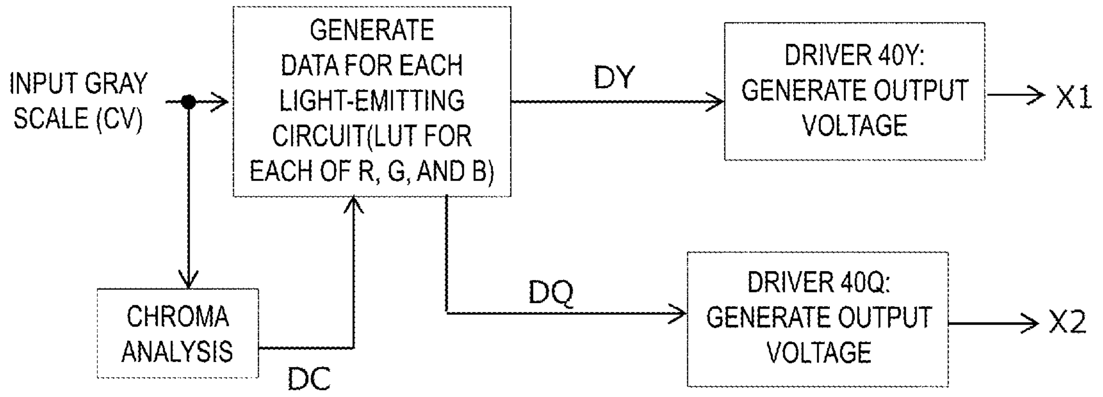
FIG. 15 is a block diagram illustrating a function of the control unit and the drive unit of a second embodiment.
Figure 16:
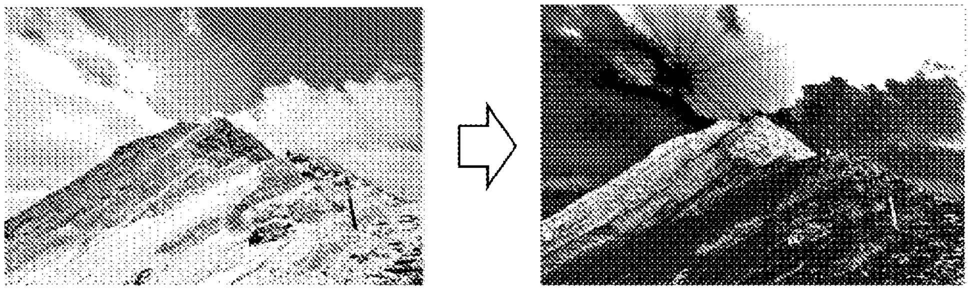
FIG. 16 is an example showing a relationship between an input image and chroma data.

FIG. 15 is a block diagram illustrating a function of the control unit and the drive unit of a second embodiment. FIG. 16 is an example showing a relationship between an input image (color image) and chroma data. For example, the control unit 50 performs chroma analysis (generation of the chroma data) as shown in FIG. 16 based on the input gray scale CV, and generates the first data DY corresponding to the first light-emitting circuit X1 and the second data DQ corresponding to the second light-emitting circuit X2 based on chroma data DC as the analysis result, the input gray scale CV and the look-up table (LUT). The LUT is preferably prepared for the R subpixel, the G subpixel, and the B subpixel. The driver 40Y (FIG. 1) of the drive unit 40 generates output voltages corresponding to the first data DY and writes the output voltages to the capacitance element Cp of the first light-emitting circuit X1 via the data signal line S1. The driver 40Q (FIG. 1) of the drive unit 40 generates output voltages corresponding to the second data DQ and writes the output voltages to the capacitance element Cp of the second light-emitting circuit X2 via the data signal line S2.

Figure 17:
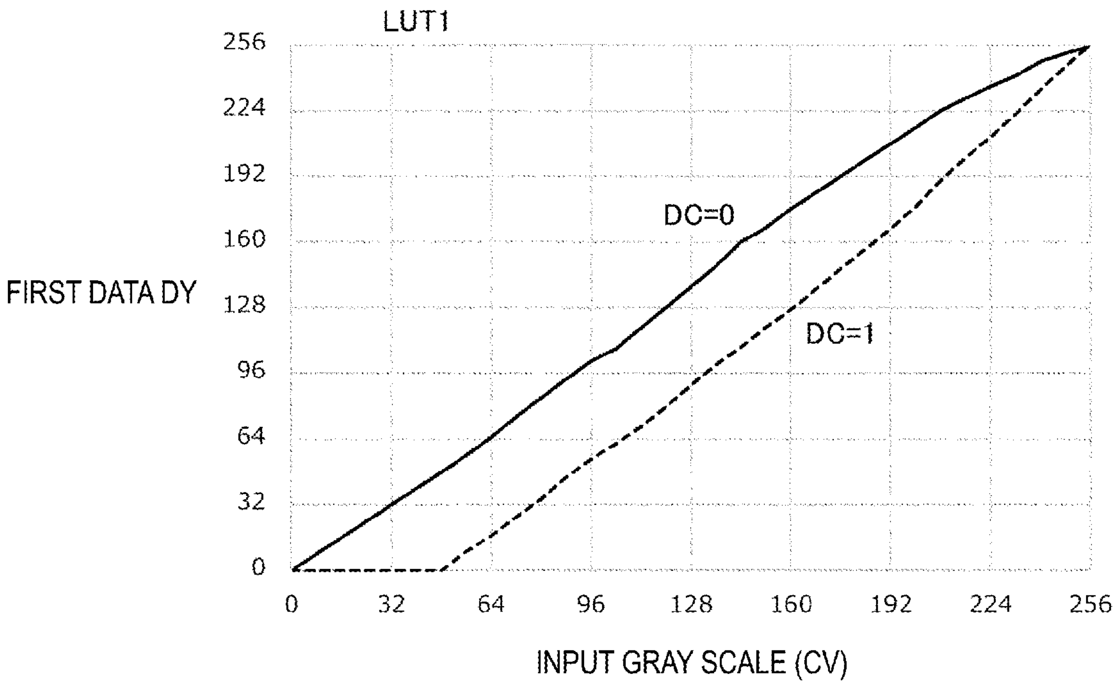
FIG. 17 is an example of LUTs used for generating the first data in the second embodiment.
Figure 18:
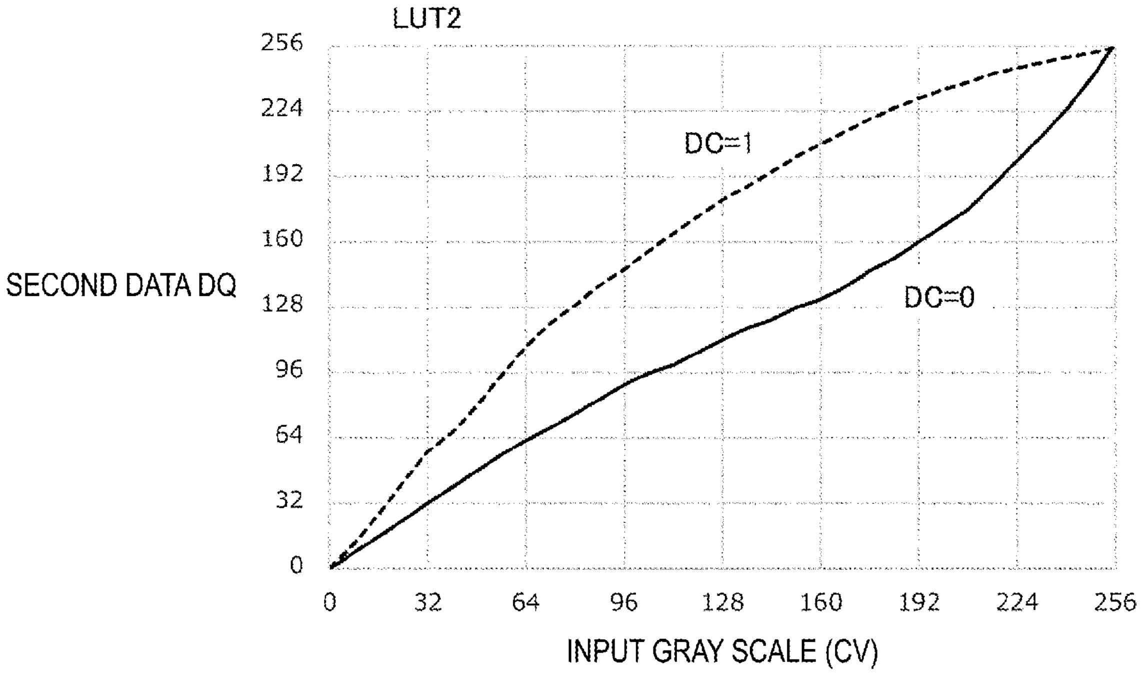
FIG. 18 is an example of LUTs used for generating the second data in the second embodiment.

FIG. 17 is an example of the LUTs used for generating the first data in the second embodiment. FIG. 18 is an example of the LUTs used for generating the second data in the second embodiment. Although each of FIGS. 17 and 18 shows the LUT when the chroma data is 0 and the LUT when the chroma data is 1.0, an LUT obtained by linear interpolation may be used when $0<DC<1$.

Although there are a plurality of methods of the chroma analysis, the chroma data DC (0 to 1.0) can be calculated in a pixel unit using the following equation in a simple manner. Here, it is assumed that the R subpixel, the G subpixel, and the B subpixel constitute a pixel.

$$DC=(CV\max-CV\min)\div CV\max$$

CVmax is a maximum value of the input gray scales of the R subpixel, the G subpixel, and the B subpixel.

CVmin is a minimum value of the input gray scales of the R subpixel, the G subpixel, and the B subpixel.

In the case of CV (R=255, G=32, B=192) in the pixel unit, DC=0.875.

In the case of CV (R=255, G=224, B=192) in the pixel unit, DC=0.247

In the case of CV (R=128, G=96, B=64) in the pixel unit, DC=0.500.

In FIG. 16, a chroma coefficient is calculated in the pixel unit of the input image using the above equation, and visualization is performed such that the chroma data 0 is black and the chroma data 1.0 is white. The calculation of the chroma data is not limited to be in the pixel unit, but may be performed in a block unit including a plurality of the pixels. In the case of the block unit, the CVmax and CVmin may be obtained from the input gray scales of a plurality of the R subpixels, a plurality of the G subpixels, and a plurality of the B subpixels included in the plurality of pixels in the block.

Note that pixels whose chroma data is higher than a threshold value may be counted for an entire screen, and when the number of the pixels is a predetermined value or more, it may be determined that the input image includes a region with high chroma, and a common conversion LUT (for example, DC=1 in FIGS. 17 and 18) may be used for the entire screen.

Third Embodiment

Figure 19:
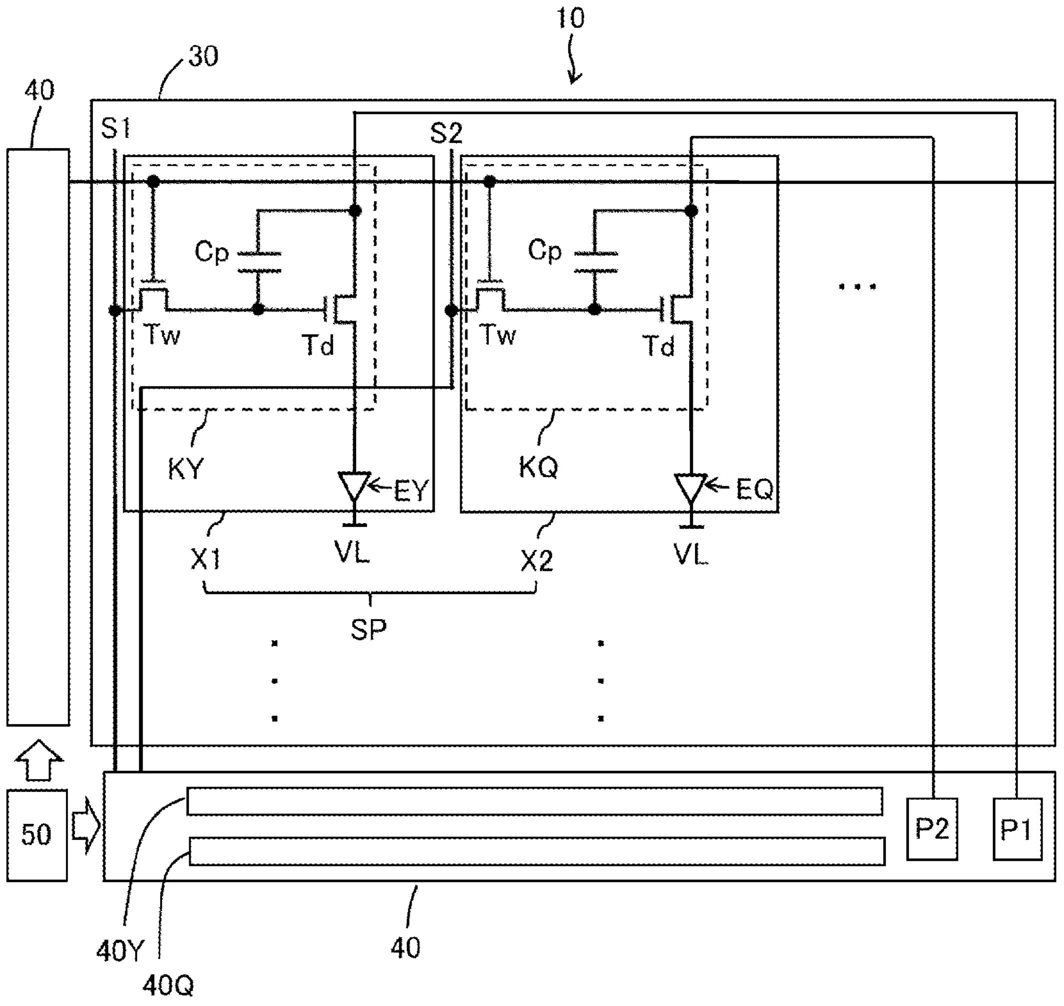
FIG. 19 is a schematic view illustrating a configuration of the display device according to a third embodiment.

FIG. 19 is a schematic view illustrating a configuration of the display device according to a third embodiment. As illustrated in FIG. 19, the display device 10 may be provided with a first power supply P1 that supplies power to the first light-emitting circuit X1 and a second power supply P2 that supplies power to the second light-emitting circuit X2. The first and second power supplies P1 and P2 may be included in the drive unit 40.

Figure 20:
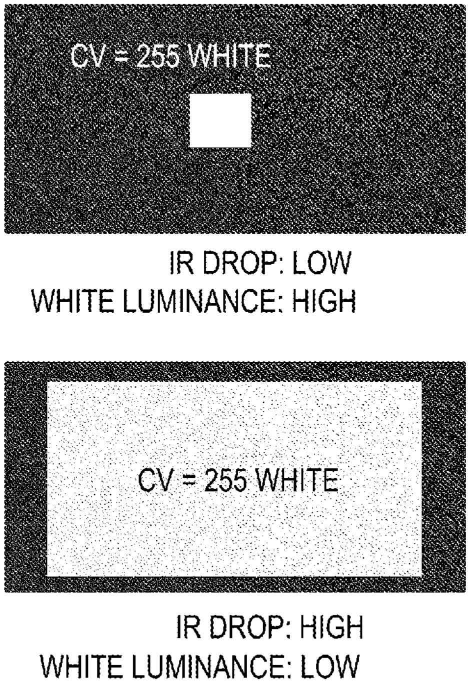
FIG. 20 is a schematic view illustrating a change in luminance due to IR drop.
Figure 21:
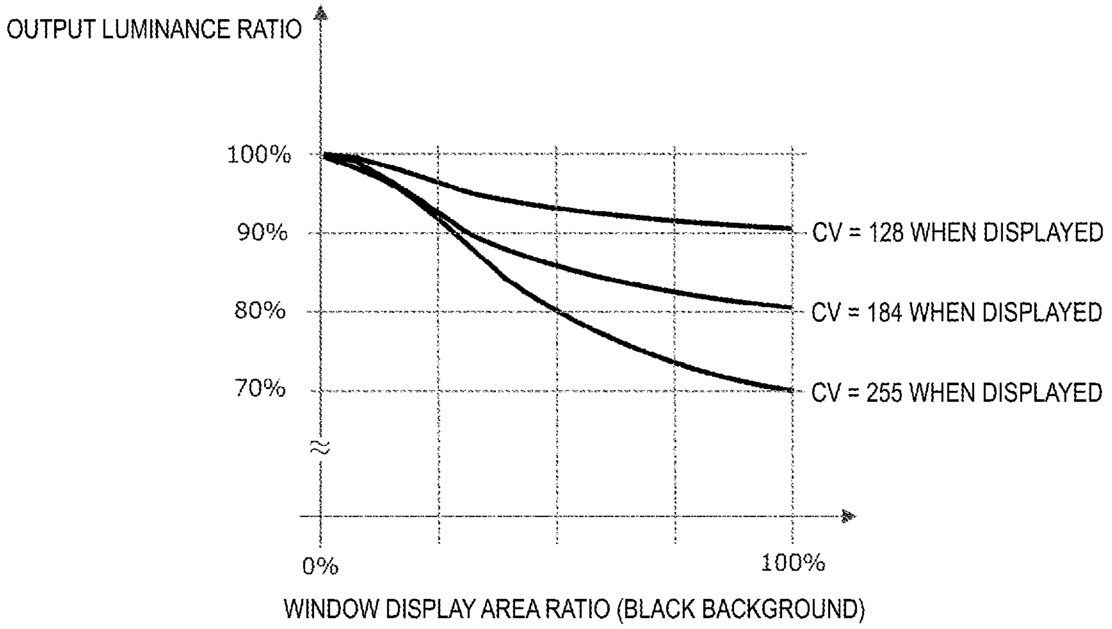
FIG. 21 is a graph showing changes in luminance due to IR drop.

In a self-luminous display device, when current consumption increases, a voltage becomes difficult to be written to the light-emitting circuit due to the influence of IR drop, and luminance may decrease. FIG. 20 is a schematic view illustrating a change in luminance due to IR drop. FIG. 21 is a graph showing changes in luminance due to IR drop. It can be seen from FIGS. 20 and 21 that as an area of a bright window with a black background increases, IR drop increases and the luminance of the bright window decreases. This phenomenon can be suppressed by dividing the power supply for each light-emitting circuit (providing the first and second power supplies P1 and P2) as illustrated in FIG. 19, but even in the configuration illustrated in FIG. 19, display defects (insufficient luminance, color shift, and the like) may occur due to the influence of IR drop, for example, when the second light-emitting circuit X2 is prioritized in a wide range.

Figure 22:
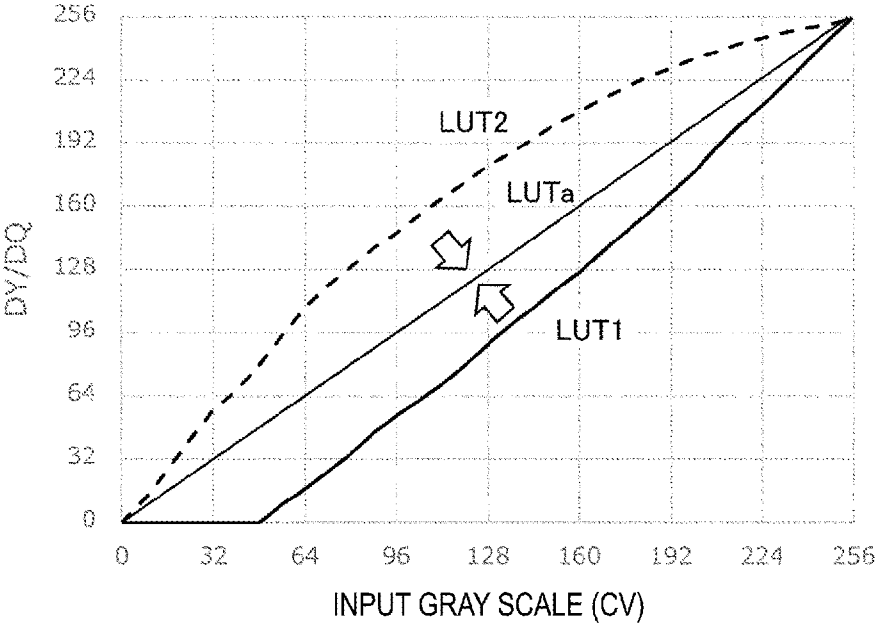
FIG. 22 is an example of LUTs used for generating the first and second data in the third embodiment.

FIG. 22 is an example of the LUTs used for generating the first and second data in the third embodiment. In the third embodiment, a method of suppressing IR drop influence while maintaining the effects of the first and second embodiments will be described. Specifically, when the consumed currents of the light-emitting circuits are greatly different from each other, adjustment is performed in a direction in which the consumed currents are equalized so that a great difference in the consumed currents does not occur between the light-emitting circuits. The sum of currents consumed by the first light-emitting circuits X1 of all the subpixels and the sum of currents consumed by the second light-emitting circuits X2 of all the subpixels are estimated, and the LUT1 for generating the first data DY and the LUT2 for generating the second data DQ are corrected according to the estimation results, for example, as shown in FIG. 22. Specifically, when it is estimated that the sum of currents consumed by the second light-emitting circuits X2 of all the subpixels is great, correction is performed to bring the LUT2 closer to an LUTa and correction is performed to bring the LUT1 closer to the LUTa.

Figure 23:
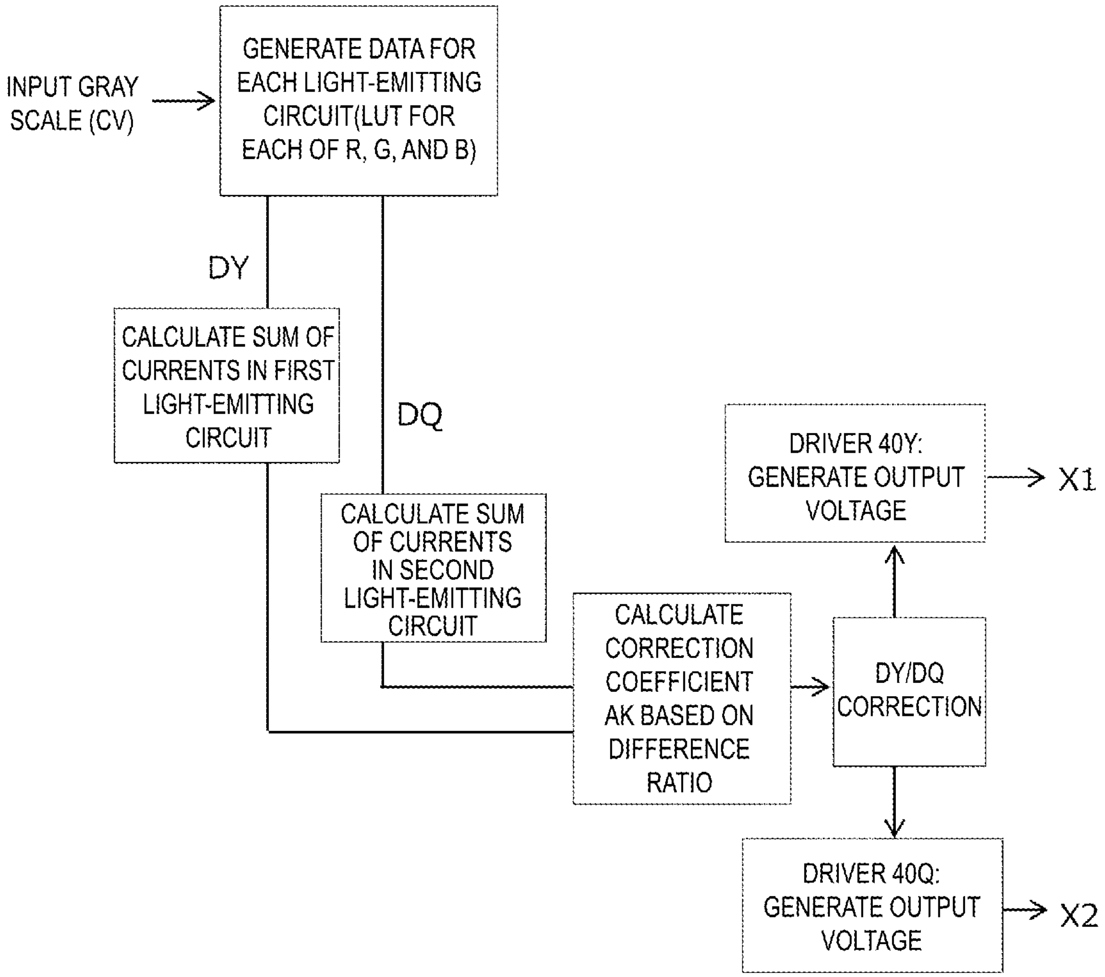
FIG. 23 is a block diagram illustrating a function of the control unit and the drive unit of the third embodiment.

FIG. 23 is a block diagram illustrating a function of the control unit and the drive unit of the third embodiment. For example, the control unit 50 generates the first data DY corresponding to the first light-emitting circuit X1 and temporary second data DQ corresponding to the second light-emitting circuit X2 based on the input gray scale CV and the LUTs (for example, FIG. 11). The LUT is preferably prepared for the R subpixel, the G subpixel, and the B subpixel.

Figure 24:
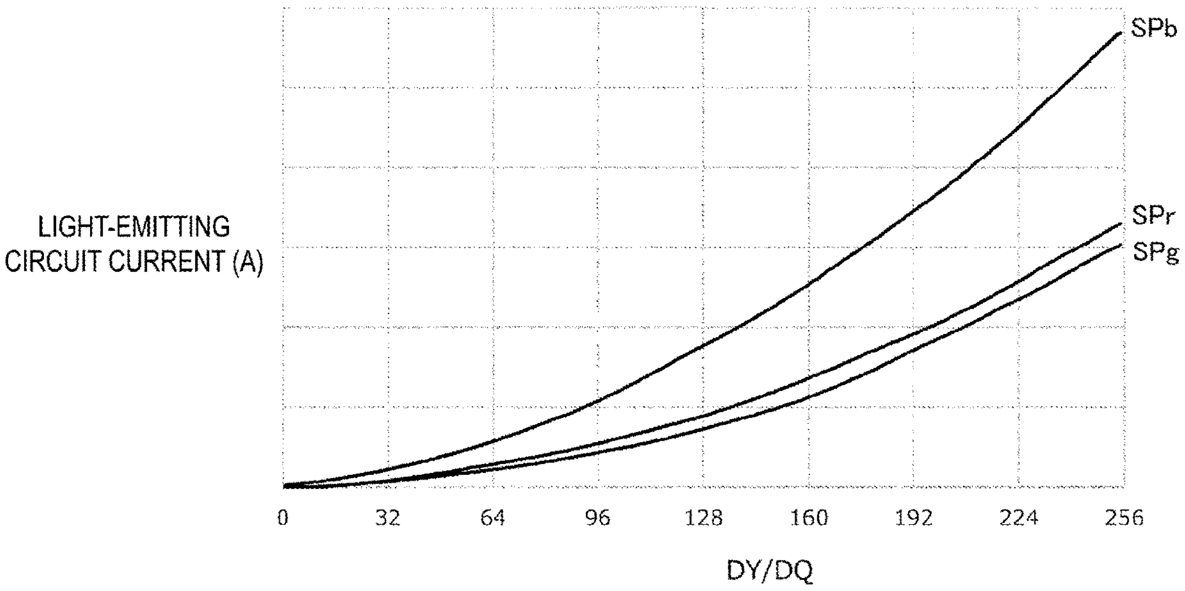
FIG. 24 is input/output characteristics showing relationships between the first and second data and consumed currents of light-emitting circuits.

FIG. 24 is input/output characteristics (for each of R, G, and B) showing relationships between the first and second data and consumed currents of light-emitting circuits. When voltage-current characteristics are the same in the first and second light-emitting circuits X1 and X2, three LUTs (for each of R, G, and B) indicating the input/output characteristics may be prepared, and when the voltage-current characteristics are different, six LUTs may be prepared.

The control unit 50 further, by using the input/output characteristics (LUTs) of FIG. 24, calculates the sum of currents in the first light-emitting circuit X1 from temporary first data DY of all the subpixels and calculates the sum of currents in the second light-emitting circuit X2 from the temporary second data DQ of all the subpixels, and corrects the LUTs according to the calculation results thereof. When the LUTs are corrected, the first and second data DY and DQ are corrected using the corrected LUTs and are output to the drive unit 40, and when the LUTs are not corrected, the temporary first and second data DY and DQ are output (as they are) to the drive unit 40. The driver 40Y (FIG. 1) of the drive unit 40 generates output voltages corresponding to the first data DY and writes the output voltages to the capacitance element Cp of the first light-emitting circuit X1 via the data signal line S1. The driver 40Q (FIG. 1) of the drive unit 40 generates output voltages corresponding to the second data DQ and writes the output voltages to the capacitance element Cp of the second light-emitting circuit X2 via the data signal line S2.

A plurality of the LUTs may be prepared for correction of the LUT and selected in accordance with a correction coefficient AK, or the LUT may be corrected using the correction coefficient AK. The correction coefficient AK is, for example, 0 to 1.0. When the correction coefficient AK is 1.0, a curve of the LUT2 in FIG. 22 is adopted (without correcting the LUT), and when the correction coefficient AK is 0, a curve of the LUTa (equally divided) is adopted. When the correction coefficient AK is an intermediate value (0<AK<1), a curve obtained by linearly interpolating the curve of the LUT2 and the curve of the LUTa is adopted.

An equation for calculating the correction coefficient AK is as follows. First, a current value difference ratio AS is calculated (the amount of deviation from the average value), and as an allowable range from the current value difference ratio, for example, when the AS is 0.15 or less, the correction coefficient is set to 1.0, when the AS is 0.75 or more, the correction coefficient is set to 0, and when the AS is between 0.15 and 0.75, calculation is performed by linear interpolation. Note that the LUT is corrected only when the sum of currents AT2 in the second light-emitting circuits X2 of all the subpixels>the sum of currents AT1 in the first light-emitting circuits X1 of all the subpixels is satisfied, and otherwise, the correction coefficient AK=1.0 (not corrected). Thus, when the current value difference ratio between the sum of currents in the first light-emitting circuit X1 (the total value of the first current values in X1) and the sum of currents in the second light-emitting circuit X2 (the total value of the second current values in X2) exceeds a reference value, the first data DY and the second data DQ are corrected so that the difference between these total values becomes less.

$$\text{Correction coefficient } AK = 1 - (AS - A\min)/(A\max - A\min)$$

$$\text{Current value difference ratio } AS = (AT2 - AT1)/(AT1 + AT2)$$

Minimum value of current value difference ratio=Amin (for example, 0.15)

Maximum value of current value difference ratio=Amax (for example, 0.75)

In this calculation method, current value count (calculation of the average value) need to be performed on the RGB subpixels for the entire screen. Thus, after all data for one screen is stored and an average of the entire screen is calculated, the current value count is calculated for input data of each pixel. In this case, a memory capacity for the one screen is required, and the display is delayed by one frame. When there is no significant change between a previous and a subsequent frames of a general image, an average value of the past frames may be used.

In the above calculation method, the method is described in which the count (average value) of the entire screen is first obtained, and then the correction coefficient is calculated. In addition, a simple method may also be considered in which the correction coefficient is calculated by obtaining an average value in a line unit or a correction coefficient is calculated based on an average value of RGB subpixels in the pixel unit. However, in these cases, the distribution may be biased to one side depending on the balance of the RGB subpixels. When this bias is accumulated, the currents of the upper and lower layers are not uniform in total over the entire screen. Thus, a method to be adopted may be determined according to the cost and performance targets.

In addition, when the calculation is strictly performed for each frame, the correction coefficient frequently fluctuates, which may be noticeable as a fluctuation in the display luminance. As a countermeasure therefor, the correction coefficient may be smoothly changed in the time direction. Upper and lower limits may be provided for an amount of variation with respect to the previous frame so that the amount of variation does not exceed a set range.

In the present embodiment, in order to obtain the sum of the current consumption, a current consumption amount of the entire screen is obtained after calculating the current for each light-emitting circuit. On the other hand, the correction coefficient may be calculated based on the average of the entire screen on the CV value simply allocated to each light-emitting circuit.

In the first to third embodiments described above, the case is described in which the voltage-current characteristics are the same in the first light-emitting circuit X1 and the second light-emitting circuit X2. However, the first to third embodiments can also be applied to a case where the voltage-current characteristics are different.

The embodiments described above are for the purpose of illustration and description and are not intended to be limiting. It will be apparent to those skilled in the art that many variations will be possible in accordance with these examples and descriptions.

The invention claimed is:

1. A display device comprising:

a display portion including:

a first element layer including an organic light-emitting layer, and a second element layer including a quantum dot light-emitting layer configured to emit light of a same color as the organic light-emitting layer, the second element layer overlapping the first element layer in a plan view viewed in a normal direction of the organic light-emitting layer; and a control unit configured to generate first data corresponding to the first element layer and second data corresponding to the second element layer based on input data, wherein the control unit generates the first data and the second data in such a manner that a luminance of the second element layer is higher than a luminance of the first element layer when the input data is less than a predetermined gray scale, and generates the first data and the second data in such a manner that the luminance of the first element layer is higher than the luminance of the second element layer when the input data is equal to or greater than the predetermined gray scale.

2. The display device according to claim 1, wherein the predetermined gray scale is higher than a median value of all gray scales.

3. The display device according to claim 1, wherein the display portion further includes a plurality of subpixels, each of the plurality of subpixels includes the first element layer and the second element layer, and the control unit generates the first data and the second data based on the input data corresponding to each of the plurality of subpixels.

4. The display device according to claim 3, wherein each of the plurality of subpixels further includes a first light-emitting circuit including the first element layer and a first pixel circuit, and a second light-emitting circuit including the second element layer and a second pixel circuit, and the display device further comprises:

a first power supply configured to supply a current to the first light-emitting circuit of each of the plurality of subpixels; and a second power supply configured to supply a current to the second light-emitting circuit of each of the plurality of subpixels.

5. The display device according to claim 4, wherein the control unit calculates a first current value of the first light-emitting circuit and a second current value of the second light-emitting circuit for each of the plurality of subpixels from the first data and the second data, respectively.

6. The display device according to claim 5, wherein the control unit corrects the first data and the second data based on a total value of each of the first current value of each of the first light-emitting circuit and a total value of each of the second current value of each of the second light-emitting circuit, respectively, in the plurality of subpixels.

7. The display device according to claim 5, wherein the plurality of subpixels includes a subpixel of a first color light emission, a subpixel of a second color light emission, and a subpixel of a third color light emission, and the control unit includes:

a look-up table (LUT) configured to convert the first data related to the subpixel of the first color light emission into the first current value of the subpixel of the first color light emission, an LUT configured to convert the second data related to the subpixel of the first color light emission into the second current value of the subpixel of the first color light emission, an LUT configured to convert the first data related to the subpixel of the second color light emission into the first current value of the subpixel of the second color light emission, an LUT configured to convert the second data related to the subpixel of the second color light emission into the second current value of the subpixel of the second color light emission, an LUT configured to convert the first data related to the subpixel of the third color light emission into the first current value of the subpixel of the third color light emission, and an LUT configured to convert the second data related to the subpixel of the third color light emission into the second current value of the subpixel of the third color light emission.

8. The display device according to claim 4, further comprising:

a drive unit configured to individually drive the first light-emitting circuit and the second light-emitting circuit.

9. The display device according to claim 1, wherein the quantum dot light-emitting layer is formed in an upper layer above the organic light-emitting layer, and the organic light-emitting layer and the quantum dot light-emitting layer overlap each other in the plan view.

10. A display device comprising:

a display portion including:

a first element layer including an organic light-emitting layer, and a second element layer including a quantum dot light-emitting layer configured to emit light of a same color as the organic light-emitting layer, the second element layer overlapping the first element layer in a plan view viewed in a normal direction of the organic light-emitting layer; and a control unit configured to generate first data corresponding to the first element layer and second data corresponding to the second element layer based on input data, wherein the display portion further includes a plurality of subpixels, each of the plurality of subpixels includes the first element layer and the second element layer, and the control unit calculates a chroma coefficient from a plurality of pieces of input data corresponding to the plurality of subpixels, and generates the first data and the second data of each of the plurality of subpixels based on the chroma coefficient.

11. The display device according to claim 10, wherein the plurality of pieces of input data comprises pieces of input data corresponding to a subpixel of a first color light emission, a subpixel of a second color light emission, and a subpixel of a third color light emission, which form one pixel.

12. The display device according to claim 10, wherein the plurality of pieces of input data comprises pieces of input data corresponding to a plurality of subpixels of a first color light emission, a plurality of subpixels of a second color light emission, and a plurality of subpixels of a third color light emission, which form a plurality of pixels.

13. The display device according to claim 12, wherein the plurality of pixels forms a part of the display portion.

14. The display device according to claim 12, wherein the plurality of pixels forms an entirety of the display portion.

15. The display device according to claim 10, wherein each of the plurality of subpixels further includes a first light-emitting circuit including the first element layer and a first pixel circuit, and a second light-emitting circuit including the second element layer and a second pixel circuit, and the display device further comprises:

a first power supply configured to supply a current to the first light-emitting circuit of each of the plurality of subpixels; and a second power supply configured to supply a current to the second light-emitting circuit of each of the plurality of subpixels.

16. The display device according to claim 15, wherein the control unit calculates a first current value of the first light-emitting circuit and a second current value of the second light-emitting circuit for each of the plurality of subpixels from the first data and the second data, respectively.

17. The display device according to claim 16, wherein the control unit corrects the first data and the second data based on a total value of each of the first current value of each of the first light-emitting circuit and a total value of each of the second current value of each of the second light-emitting circuit, respectively, in the plurality of subpixels.

18. The display device according to claim 16, wherein the plurality of subpixels includes a subpixel of a first color light emission, a subpixel of a second color light emission, and a subpixel of a third color light emission, and the control unit includes:

a look-up table (LUT) configured to convert the first data related to the subpixel of the first color light emission into the first current value of the subpixel of the first color light emission, an LUT configured to convert the second data related to the subpixel of the first color light emission into the second current value of the subpixel of the first color light emission, an LUT configured to convert the first data related to the subpixel of the second color light emission into the first current value of the subpixel of the second color light emission, an LUT configured to convert the second data related to the subpixel of the second color light emission into the second current value of the subpixel of the second color light emission, an LUT configured to convert the first data related to the subpixel of the third color light emission into the first current value of the subpixel of the third color light emission, and an LUT configured to convert the second data related to the subpixel of the third color light emission into the second current value of the subpixel of the third color light emission.

19. The display device according to claim 15, further comprising:

a drive unit configured to individually drive the first light-emitting circuit and the second light-emitting circuit.

20. The display device according to claim 10, wherein the quantum dot light-emitting layer is formed in an upper layer above the organic light-emitting layer, and the organic light-emitting layer and the quantum dot light-emitting layer overlap each other in the plan view.

* * * * *